United States Patent
Sakamoto

(10) Patent No.: US 10,326,285 B2
(45) Date of Patent: Jun. 18, 2019

(54) CHARGING DEVICE, BATTERY DEVICE, AND METHOD

(71) Applicant: CANON KABUSHIKI KAISHA, Tokyo (JP)

(72) Inventor: Hiromichi Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 15/011,317

(22) Filed: Jan. 29, 2016

(65) Prior Publication Data

US 2016/0226271 A1 Aug. 4, 2016

(30) Foreign Application Priority Data

Feb. 3, 2015 (JP) .................................. 2015-019609

(51) Int. Cl.
*H02J 7/00* (2006.01)

(52) U.S. Cl.
CPC ............ *H02J 7/0021* (2013.01); *H02J 7/007* (2013.01); *H02J 7/0029* (2013.01); *H02J 7/0052* (2013.01); *H02J 7/0081* (2013.01); *H02J 2007/004* (2013.01)

(58) Field of Classification Search
CPC ...... H02J 7/0021; H02J 7/0081; H02J 7/0029; H02J 7/0052; H02J 7/007; H02J 2007/004

See application file for complete search history.

(56) References Cited

U.S. PATENT DOCUMENTS

| | | | |
|---|---|---|---|
| 7,091,698 B2 | 8/2006 | Yamazaki et al. | |
| 7,626,394 B2 | 12/2009 | Kimura | |
| 8,587,254 B2 | 11/2013 | Kobayashi et al. | |
| 9,178,380 B2 | 11/2015 | Kawai et al. | |
| 9,217,779 B2 | 12/2015 | Xu et al. | |
| 2004/0160224 A1 | 8/2004 | Yamazaki et al. | |
| 2008/0204031 A1 | 8/2008 | Kimura et al. | |
| 2009/0326749 A1 | 12/2009 | Uchida | |
| 2012/0049804 A1 | 3/2012 | Kobayashi et al. | |

(Continued)

FOREIGN PATENT DOCUMENTS

| | | |
|---|---|---|
| CN | 1862279 A | 11/2006 |
| CN | 101243325 B | 2/2011 |

(Continued)

*Primary Examiner* — Drew A Dunn
*Assistant Examiner* — Sailesh Thapa
(74) *Attorney, Agent, or Firm* — Canon U.S.A., Inc. IP Division

(57) ABSTRACT

A charging device that charges a battery device is provided. The battery device includes a memory that stores first degradation information indicating a degradation state of the battery device. The charging device includes: a voltage detection unit that detects a voltage of the battery device; and a control unit that (a) receives the first degradation information from the battery device, (b) determines degradation progress information indicating a progress degree of the degradation state of the battery device, by using a voltage detected by the voltage detection unit, (c) generates second degradation information indicating a degradation state of the battery device, by using the degradation progress information and the first degradation information, and (d) transmits the second degradation information to the battery device to cause the battery device to store the second degradation information in the memory.

14 Claims, 6 Drawing Sheets

(56) References Cited

U.S. PATENT DOCUMENTS

| | | | |
|---|---|---|---|
| 2013/0063079 A1 | 3/2013 | Kawai et al. | |
| 2013/0085696 A1 | 4/2013 | Xu et al. | |
| 2017/0160349 A1* | 6/2017 | Iida | G01R 31/3679 |
| 2017/0371000 A1* | 12/2017 | Fukushima | G01R 31/3679 |

FOREIGN PATENT DOCUMENTS

| | | |
|---|---|---|
| CN | 102386454 A | 3/2012 |
| CN | 102959418 A | 3/2013 |
| CN | 103001299 A | 3/2013 |
| JP | H05-112914 A | 7/1993 |
| JP | 2003-329744 A | 11/2003 |
| JP | 2004257781 A | 9/2004 |
| JP | 2012-247428 A | 12/2012 |
| JP | 2013024725 A | 2/2013 |
| WO | 2013011692 A1 | 1/2013 |

* cited by examiner

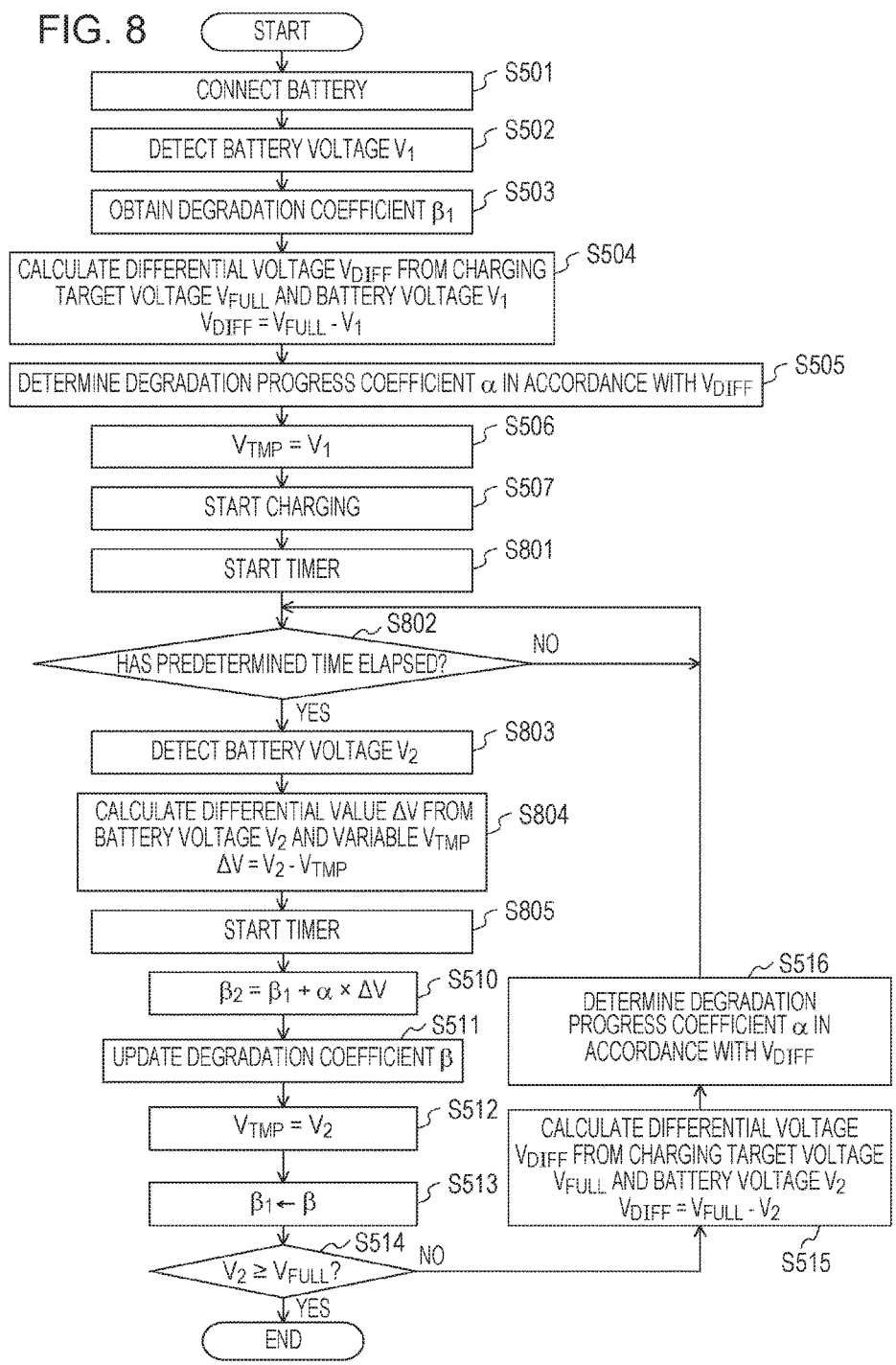

CHARGING DEVICE, BATTERY DEVICE, AND METHOD

BACKGROUND

Field of the Invention

The present invention relates to a battery device, a charging device that charges the battery device, a method, and a storage medium.

Description of the Related Art

A method of determining a degradation state of a battery device includes a method of determining the degradation state of the battery device by using the number of times of battery charging (see Japanese Patent Laid-Open No. 5-172914). Japanese Patent Laid-Open No. 5-172914 discloses a method of determining a life of a battery by using the number of times of battery charging.

A lithium-ion battery easily degrades when the battery is charged from a state wherein a depth of discharge (DOD) is large. However, according to the method described in Japanese Patent. Laid-Open No. 5-172914, a problem occurs that the degradation state of the battery device is determined without taking into account the DOD.

In addition, it is not necessarily the case that the lithium-ion battery hardly degrades when the battery is charged from a state wherein the DOD is small. A progress degree of the degradation state of the battery device may vary depending on a charging voltage when the charging is started. However, according to the method described in Japanese Patent Laid-Open No. 5-172914, a problem also occurs that how the charging voltage at the time of the charging start affects the degradation state of the battery device is not taken into account.

As the method of determining the degradation state of the battery device, a method of determining the degradation state of the battery device from an internal resistance of battery cells is conceivable in addition to the method of determining the degradation state of the battery device by using the number of times of battery charging.

However, according to the method of determining the degradation state from the internal resistance of the battery cells, since it is difficult to accurately calculate the internal resistance, an issue occurs that it is difficult to accurately determine the degradation state of the battery device.

In addition, as the method of determining the degradation state of the battery device, a method of determining the degradation state of the battery device by providing a coulomb counter circuit or the like in the battery device and using the coulomb counter circuit or the like is conceivable in addition to the method of determining the degradation state of the battery device by using the number of times of battery charging.

However, according to the method of determining the degradation state of the battery device by using the coulomb counter circuit or the like, an issue occurs that a circuit scale of the battery device is enlarged to increase costs. Furthermore, an issue also occurs that, since the coulomb counter circuit or the like needs to be regularly operated, power consumption of the battery device is increased, and the remaining power amount of the battery device is decreased at a still faster pace.

SUMMARY

According to an aspect of the present invention, a degradation state of a battery device can be determined by using a method different from the method in the related art.

According to an aspect of the present invention, there is provided a charging device that charges a battery device, the charging device including: a voltage detection unit that detects a voltage of the battery device, wherein the battery device includes a memory that stores first degradation information indicating a degradation state of the battery device; and a control unit that (a) receives the first degradation information from the battery device, (b) determines degradation progress information indicating a progress degree of the degradation state of the battery device, by using a voltage detected by the voltage detection unit, (c) generates second degradation information indicating a degradation state of the battery device, by using the degradation progress information and the first degradation information, and (d) transmits the second degradation information to the battery device to cause the battery device to store the second degradation information in the memory.

According to an aspect of the present invention, there is provided a battery device including: a memory that stores first degradation information indicating a degradation state of the battery device; and a control unit that (a) transmits the first degradation information to a charging device, (b) receives second degradation information indicating a degradation state of the battery device from the charging device, and (c) updates the memory after the second degradation information is received from the charging device in a manner that the second degradation information is stored in the memory, wherein the charging device includes: a voltage detection unit that detects a voltage of the battery device; and a control unit that (a) receives the first degradation information from the battery device, (b) determines degradation progress information indicating a progress degree of the degradation state of the battery device, by using a voltage detected by the voltage detection unit, (c) generates the second degradation information, by using the degradation progress information and the first degradation information, and (d) transmits the second degradation information to the battery device to cause the battery device to store the second degradation information in the memory.

Further features and aspects of the present invention will become apparent from the following description of exemplary embodiments.

BRIEF DESCRIPTION OF THE DRAWINGS

FIG. 8 is a flow chart for illustrating a third degradation state determination process.

DESCRIPTION OF THE EMBODIMENTS

Exemplary embodiments, features, and aspects of the present invention will be described below with reference to the drawings.

First Exemplary Embodiment

Figure 1:
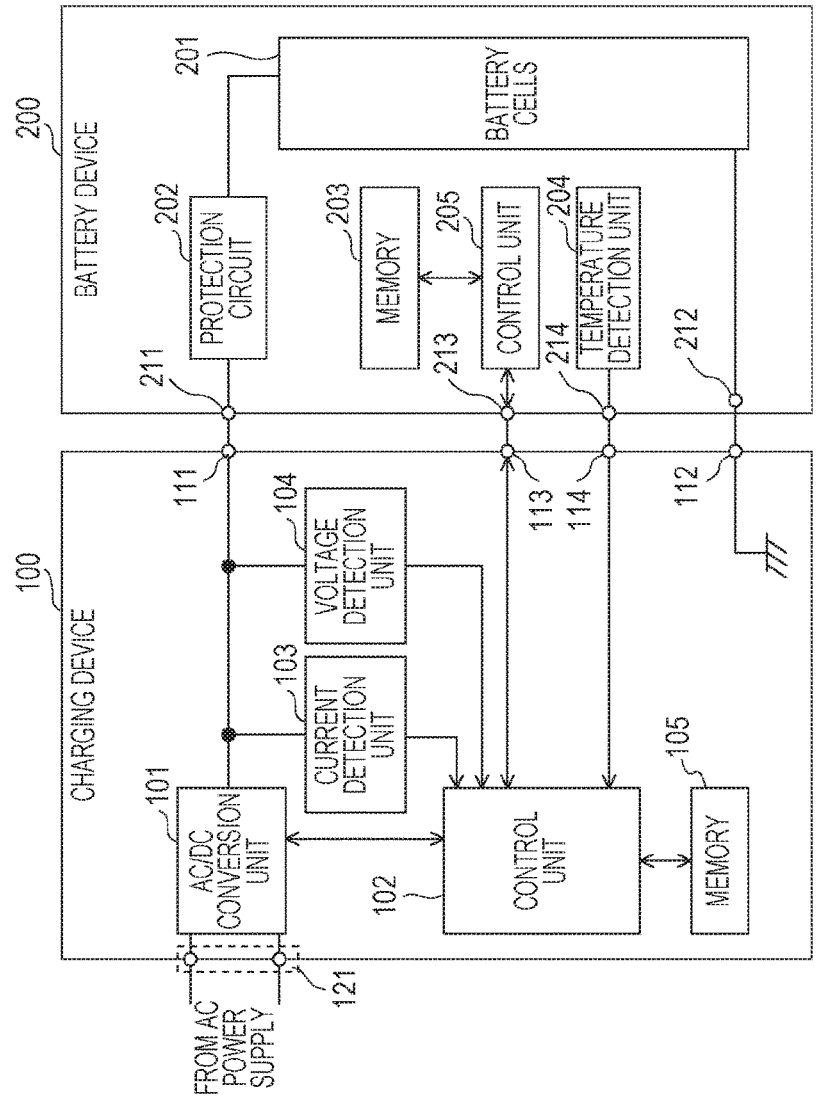
FIG. 1 is a block diagram for illustrating an example configuration of a charging system according to first to third exemplary embodiments.

FIG. 1 is a block diagram for illustrating an example configuration of a charging system according to first to third exemplary embodiments. The charging system according to the first exemplary embodiment includes a charging device 100 and a battery device 200.

The charging device 100 is configured to be able to charge the battery device 200. The charging device 100 includes an AC/DC conversion unit 101, a control unit 102, a current detection unit 103, a voltage detection unit 104, a memory 105, four terminals 111 to 114, and a connection section 121. The AC/DC conversion unit 101, the control unit 102, the current detection unit 103, the voltage detection unit 104, the memory 105, the four terminals 111 to 114, the connection section 121, or at least one of these components has a hardware structure.

The battery device 200 includes battery cells 201, a protection circuit 202, a memory 203, a temperature detection unit 204, a control unit 205, and four terminals 211 to 214. The four terminals 211 to 214, the protection circuit 202, the memory 203, the temperature detection unit 204, the control unit 205, or at least one of these components has a hardware structure.

The charging device 100 and the battery device 200 are connected to each other via the four terminals 111 to 114 and the four terminals 211 to 214. The terminal 111 and the terminal 211 are plus terminals. The terminal 112 and the terminal 212 are minus terminals. The terminal 113 and the terminal 213 are communication terminals. The terminal 114 and the terminal 214 are terminals with which notification of a signal indicating a temperature of the battery cells 201 is performed.

The connection section 121 is connected to a commercial alternating-current power supply (AC power supply) and receives AC power from the commercial AC power supply. The AC/DC conversion unit 101 converts the AC power received by the connection section 121 to direct-current (DC) power and also generates a charging voltage and a charging current instructed by the control unit 102. The AC/DC conversion unit 101 supplies the generated charging voltage and charging current to the battery device 200 via the terminal 111 and the terminal 211. In addition, the AC/DC conversion unit 101 generates power for the charging device 100 and the battery device 200 to operate.

The control unit 102 includes a hardware structure for controlling all of the components in the charging device 100. For example, the control unit 102 includes one or more microcomputers or microprocessors as the hardware structure for controlling all of the components in the charging device 100. While the control unit 102 controls the AC/DC conversion unit 101, it is possible to control charging with respect to the battery device 200. The control unit 102 includes a memory M1 (for example, a volatile memory) that can be utilized as an area for various calculations. The control unit 102 can access the memory 105 (for example, a nonvolatile memory) that stores one or more programs, a plurality of constants, and the like and can also update information stored in the memory 105. While the control unit 102 executes the program stored in the memory 105, it is possible to control all of the components in the charging device 100. While the control unit 102 executes the program stored in the memory 105, it is possible to perform a predetermined calculation. While the control unit 102 executes the program stored in the memory 105, it is possible to communicate with the control unit 205 via the terminal 113 and the terminal 213. While the control unit 102 executes the program stored in the memory 105, it is possible to control the control unit 205. Therefore, the control unit 102 can control the battery device 200 via the control unit 205. The memory 105 stores various pieces of information related to the battery device 200 (such as information related to characteristics of the battery device 200). While the control unit 102 uses these pieces of information stored in the memory 105, it is possible to determine a degradation state of the battery device 200. The control unit 102 can control the charging device 100 and the battery device 200 at every predetermined time by using the timer function of the control unit 102.

The current detection unit 103 can detect the current supplied from the charging device 100 to the battery device 200. The control unit 102 is noted of a signal indicating the current detected by the current detection unit 103. The voltage detection unit 104 can detect a voltage between the terminal 111 and the terminal 112 as the voltage voltage. The control unit 102 is notified of a signal indicating the battery voltage detected by the voltage detection unit 104.

The control unit 205 includes a hardware structure for controlling all of the components in the battery device 200. For example, the control unit 205 includes one or more microcomputers or microprocessors as the hardware structure for controlling all of the components in the battery device 200. The control unit 205 includes a memory M2 (for example, a volatile memory) that can be utilized as an area for various calculations. The control unit 205 can access the memory 203 that stores one or more programs, a plurality of constants, and the like and can also update information stored in the memory 203. While the control unit 205 executes the program stored in the memory 203, it is possible to control all of the components in the battery device 200. While the control unit 205 executes the program stored in the memory 203, it is possible to perform a predetermined calculation. While the control unit 205 executes the program stored in the memory 203, it is possible to communicate with the control unit 102 via the terminal 113 and the terminal 213.

The battery cells 201 include, for example, two battery cells. The two battery cells of the battery cells 201 are, for example, lithium ion battery cells formed of lithium ion polymer or the like. The two battery cells of the battery cells 201 are connected to each other in series, for example. The two battery cells of the battery cells 201 are charged by power supplied from the charging device 100 via the terminal 111 and the terminal 211. For example, in a case where the battery device 200 is fully charged, a cell voltage of the battery cells 201 is, for example, approximately 8.4 V. A final voltage of the battery device 200 is, for example, approximately 6.0 V. It should be noted that the number of battery cells of the battery cells 201 is not limited to two and may be one or three or more.

In a case where a value of the charging current becomes a predetermined value or higher, the protection circuit 202 interrupts a current path to avoid the flow of an excess charging current to the battery cells 201.

The memory 203 is a nonvolatile memory that stores a degradation coefficient β corresponding to degradation information indicating the degradation state of the battery device 200. The memory 203 includes, for example, an EEPROM. The degradation coefficient β is equivalent to the degradation information indicating the degradation state of the battery device 200.

The temperature detection unit 204 includes, for example, an element such as a thermistor and is arranged at a position where a temperature of the battery cells 201 can be detected. The control unit 102 receives a signal indicating the temperature detected by the temperature detection unit 204 via the terminal 114 and the terminal 214.

The control unit 102 controls the charging of the battery device 200 by using the current detected by the current detection unit 103, the battery voltage detected by the voltage detection unit 104, and the temperature detected by the temperature detection unit 204. The charging of the battery device 200 is executed while the control unit 102 controls the AC/DC conversion unit 101.

Figure 2:
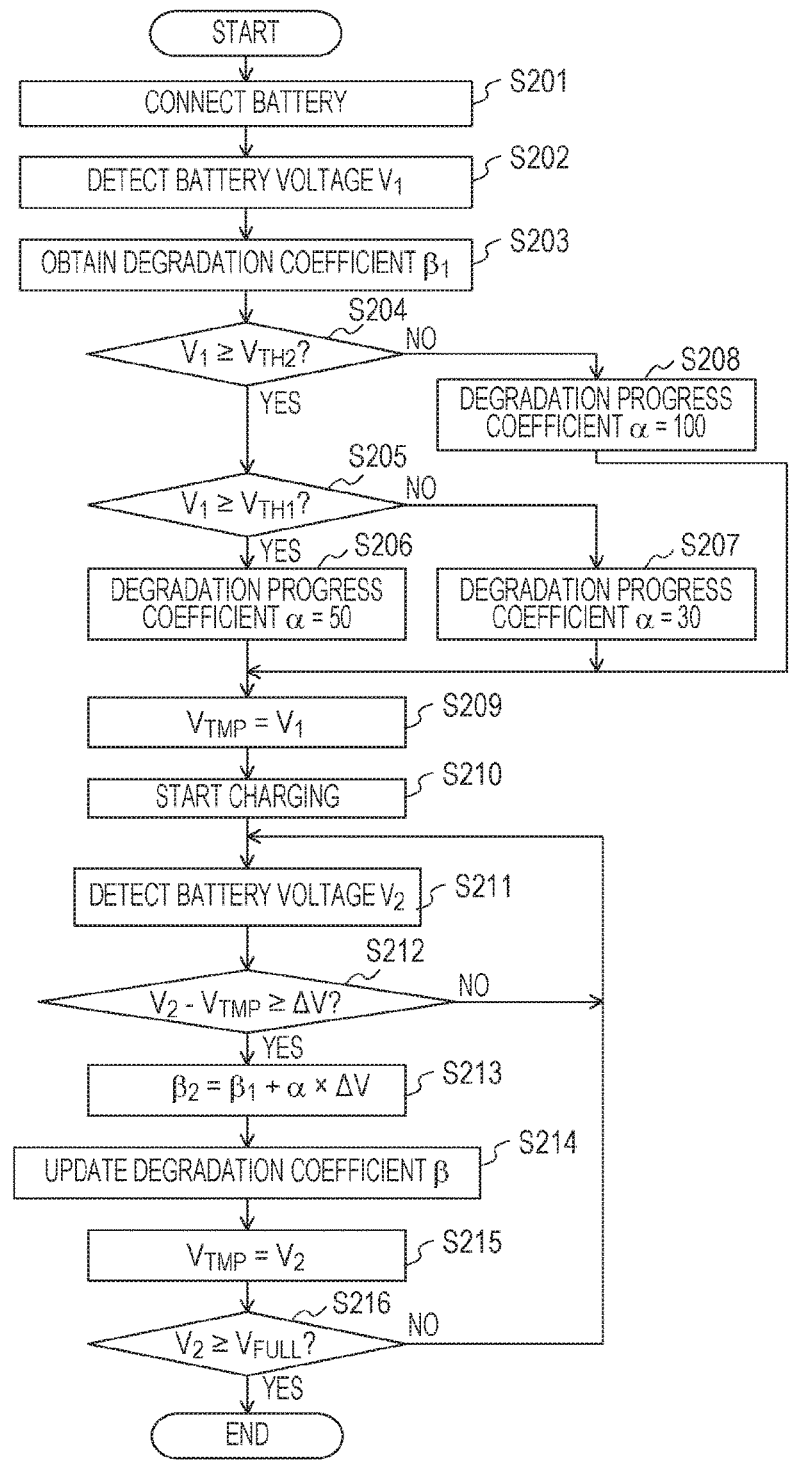
FIG. 2 is a flow chart for illustrating a first degradation state determination process.

FIG. 2 is a flow chart for illustrating a first degradation state determination process. It should be noted that a program for controlling execution of the first degradation state determination process is stored in the memory 105 such that the execution can be performed in the control unit 102.

In step S201, the control unit 102 detects that the battery device 200 is connected to the charging device 100.

In step S202, the voltage detection unit 104 detects a battery voltage V1 of the battery device 200 before the charging of the battery device 200 is started. The control unit 102 is notified of the battery voltage V1 detected by the voltage detection unit 104 from the voltage detection unit 104. The control unit 102 stores the battery voltage V1 notified from the voltage detection unit 104 in the memory M1 in the control unit 102.

In step S203, the control unit 102 transmits a signal for requesting the degradation coefficient β stored in the memory 203 to the control unit 205, and then receives the degradation coefficient β from the control unit 205. The control unit 102 stores the degradation coefficient β received from the control unit 205 in the memory M1 in the control unit 102 as a degradation coefficient β1 (first degradation information.

Figure 3:
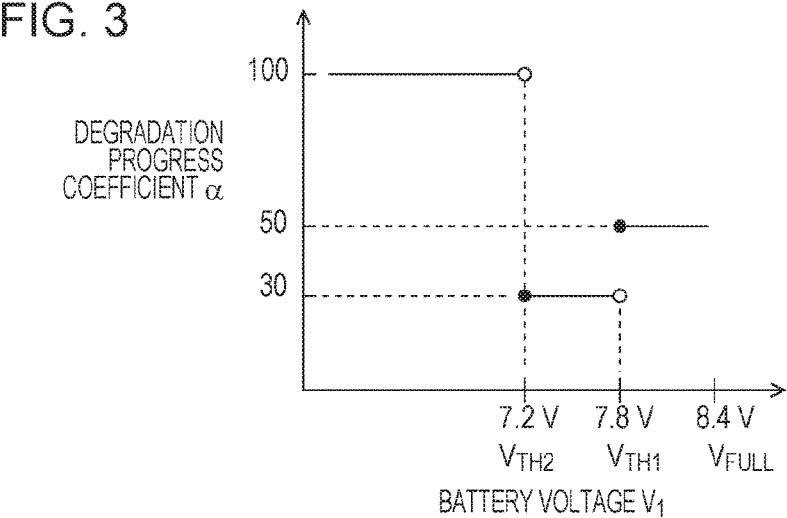
FIG. 3 is an explanatory diagram for illustrating an example relationship between a battery voltage and a degradation progress coefficient (degradation progress information).

FIG. 3 is an explanatory diagram for illustrating an example relationship between the battery voltage V1 detected before the start of the charging and a degradation progress coefficient α (degradation progress information). The degradation progress coefficient α is equivalent to the degradation progress information indicating a progress degree of the degradation state of the battery device 200. Information representing the relationship between the battery voltage V1 detected before the start of the charging and the degradation progress coefficient α (degradation progress information) is stored in the memory 105 as the information that can be processed by the control unit 102. In FIG. 3, the horizontal axis represents the battery voltage V1, and the vertical axis represents the degradation progress coefficient α (degradation progress information) determined by taking into account a depth of discharge (DOD) As illustrated in FIG. 3, according to the first exemplary embodiment, a segment of the battery voltage V1 is partitioned into a plurality of different segments, and different values of the degradation progress coefficient α are assigned to the respective segments. For example, in FIG. 3, the segment of the battery voltage V1 is partitioned into three segments by a first threshold Vth1 and a second threshold Vth2. For example, the first threshold Vth1 is lower than a charging target voltage VFULL, and the second threshold Vth2 is lower than the first threshold Vth1. According to the first exemplary embodiment, a case will be described where the charging target voltage VFULL is approximately 8.4 V, the first threshold Vth1 is approximately 7.8 V, and the second threshold Vth2 is approximately 7.2 V. In a case where the battery voltage V1 is lower than the second threshold Vth2 (approximately 7.2 V), the control unit 102 determines that the depth of discharge (DOD) is large, and 100 is also determined as the degradation progress coefficient α, for example. In a case where the battery voltage V1 is higher than or equal to the second threshold Vth2 (approximately 7.2 V) and is lower than the first threshold. Vth1 (approximately 7.8 V), the control unit 102 determines that the depth of discharge (DOD) IS small, and 30 is also determined as the degradation progress coefficient α, for example. In a case where the battery voltage V1 is higher than or equal to the first threshold Vth1 (approximately 7.8 V), the control unit 102 determines that the depth of discharge (DOD) is relatively medium, and 50 is also determined as the degradation progress coefficient α, for example. It should be noted that information equivalent to the first threshold Vth1, information equivalent to the second threshold Vth2, and information equivalent to the charging target voltage VFULL are stored in the memory 105 as the information that can be processed by the control unit 102.

In step S204, the control unit 102 determines whether or not the battery voltage V1 detected before the start of the charging is higher than or equal to the second threshold Vth2 (approximately 7.2 V). In a case where the battery voltage V1 detected before the start of the charging is higher than or equal to the second threshold Vth2, the control unit 102 shifts from step S204 to step S205 (S204: YES). In a case where the battery voltage V1 detected before the start of the charging is lower than the second threshold. Vth2, the control unit 102 shifts from step S204 to step S208 (S204: NO).

In step S205, the control unit 102 determines whether or not the battery voltage V1 detected before the start of the charging is higher than or equal to the first threshold Vth1 (approximately 7.8 V). In a case where the battery voltage V1 detected before the start of the charging is higher than or equal to a threshold VTH1, the control unit 102 shifts from step S205 to step S206 (S205: YES). In a case where the battery voltage V1 detected before the start of the charging is lower than the threshold VTH1, the control unit 102 shifts from step S205 to step S207 (S205: NO).

In step S206, the control unit 102 determines that the depth of discharge (DOD) is small, and 50 is also determined as the degradation progress coefficient α, for example.

In step S207, the control unit 102 determines that the depth of discharge (DOD) is relatively medium, and 30 is also determined as the degradation progress coefficient α, for example.

In step S208, the control unit 102 determines that the depth of discharge (DOD) is large, and 100 is also determined as the degradation progress coefficient α, for example. The control unit 102 stores the value of the degradation progress coefficient α (degradation progress information) determined in step S206, S207, or S208 in the memory M1 in the control unit 102.

In step S209, the control unit 102 sets the value of the battery voltage V1 detected before the start of the charging as a variable VTMP. The control unit 102 stores the variable VTMP where the value of the battery voltage V1 is set in the memory M1 in the control unit 102.

In step S210, the control unit 102 starts the charging of the battery device 200. The charging of the battery device 200 is performed while the control unit 102 controls the AC/DC conversion unit 101.

In step S211, the voltage detection unit 104 detects a battery voltage V2 of the battery device 200 during the charging of the battery device 200. The control unit 102 is notified of the battery voltage V2 detected by the voltage detection unit 104 from the voltage detection unit 104. The control unit 102 stores the battery voltage V2 notified from the voltage detection unit 104 in the memory M1 in the control unit 102.

In step S212, the control unit 102 calculates a difference between the value of the battery voltage V2 and the value of the variable VTMP and determines whether or not the difference (=V2−VTMP) is higher than or equal to a predetermined value ΔV. In a case where the difference between the value of the battery voltage V2 and the value of the variable VTMP is higher than or equal to the predetermined value ΔV, the control unit 102 shifts from step S212 to step S213 (S212: YES). In a case where the difference between the battery voltage V2 and the variable VTMP is lower than the predetermined value ΔV, the control unit 102 returns from step S212 to step S211 (S212: NO). It should be noted that information equivalent to the predetermined value ΔV is stored in the memory 105 as the information that can be processed by the control unit 102.

In step S213, the control unit 102 calculates a new degradation coefficient β2 (second degradation information). The new the degradation coefficient β2 (second degradation information) is calculated from the value of the degradation coefficient β1, the value of the degradation progress coefficient α determined on the basis of the battery voltage V1, and the predetermined value ΔV. For example, the control unit 102 calculates the new degradation coefficient β2 by using the following Expression (1). The control unit 102 stores the new the degradation coefficient β2 calculated in step S213 in the memory M1 in the control unit 102.

$$\beta2=\beta1+\alpha\times\Delta V \quad (1)$$

In step S214, to update the degradation coefficient β stored in the memory 203, the control unit 102 transmits the new degradation coefficient β2 to the control unit 205. In a case where the new degradation coefficient β2 is received from the control unit 102, the control unit 205 changes the degradation coefficient β stored in the memory 203 to the new degradation coefficient β2. For example, the control unit 205 overwrites the degradation coefficient β stored in the memory 203 with the new degradation coefficient β2. Accordingly, the degradation coefficient β stored in the memory 203 is updated to the degradation information indicating the latest degradation state of the battery device 200.

In step S215, the control unit 102 sets the value of the battery voltage V2 detected during the charging as the variable VTMP. The control unit 102 stores the variable VTMP where the value of the battery voltage V2 is set in the memory M1 in the control unit 102.

In step S216, the control unit 102 determines whether or not the battery voltage V2 detected during the charging is higher than or equal to the charging target voltage VFULL. In a case where the battery voltage V2 detected during the charging is higher than or equal to the charging target voltage VFULL, the control unit 102 ends the charging of the battery device 200 (S216: YES). In a case where the battery voltage V2 detected during the charging is lower than the charging target voltage VFULL, the control unit 102 determines that the charging of the battery device 200 is not yet completed and returns from step S226 to step S211 (S216: NO).

Figure 4:
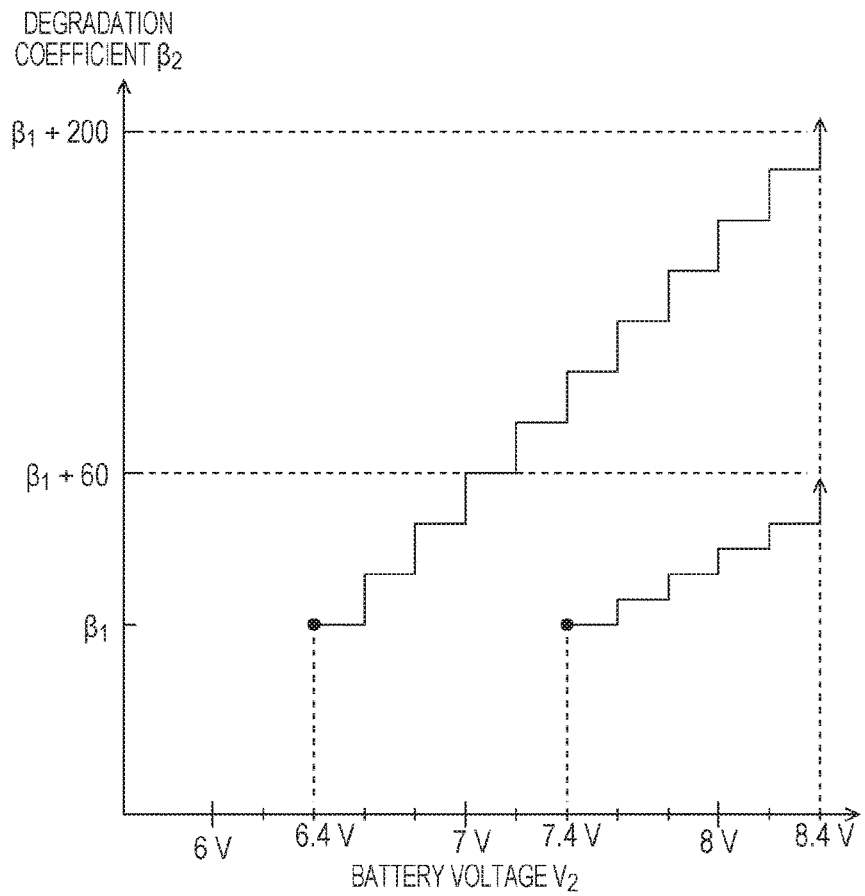
FIG. 4 is an explanatory diagram for illustrating an example relationship between a battery voltage and a new degradation coefficient (second degradation information).

FIG. 4 is an explanatory diagram for illustrating an example relationship between the battery voltage V2 and the new degradation coefficient β2 (second degradation information). Information representing the relationship between the battery voltage V2 and the new degradation coefficient β2 (second degradation information) is stored in the memory 105 as the information that can be processed by the control unit 102. In FIG. 4, the horizontal axis represents the battery voltage V2, and the vertical axis represents the degradation coefficient β2 (second degradation information). A bold solid line represents a change in a case where the charging is performed from 6.4 V to reach 8.4 V, and a thin solid line represents a change in a case where the charging is performed from 7.4 V to reach 8.4 V. In the example illustrated in FIG. 4, the predetermined value ΔV used for calculating the degradation coefficient β2 is 0.2 V.

As described above, according to the first exemplary embodiment, the value of the degradation progress coefficient α (degradation progress information) indicating the degradation progress degree of the battery device 200 can be determined in accordance with the battery voltage V1 detected before the start of the charging. Furthermore, according to the first exemplary embodiment, each time the charging by the amount equivalent to the predetermined value ΔV is performed, the latest degradation state of the battery device 200 can be determined from the degradation progress coefficient α (degradation progress information) and the degradation coefficient β1. Thus, according to the first exemplary embodiment, the degradation state of the battery device 200 can be determined by a method different from the method in the related art.

According to the first exemplary embodiment, each time the charging by the amount equivalent to the predetermined value ΔV is performed, the degradation coefficient β stored in the memory 203 can be updated to the degradation coefficient β2 indicating the latest degradation state of the battery device 200. With the above-described configuration, while the charging device 100 obtains the degradation coefficient β from the memory 203, the latest degradation state of the battery device 200 can be found out. While an electronic device (such as an image pickup apparatus) to which the battery device 200 is connected also obtains the degradation coefficient β from the memory 203, the latest degradation state of the battery device 200 can be found out. In addition, with the above-described configuration, according to the first exemplary embodiment, even when the battery device 200 is cut off from the charging device 100 during the charging, the degradation coefficient β stored in the memory 203 corresponds to the information indicating the latest degradation state of the battery device 200.

According to the first exemplary embodiment, since it is possible to update the degradation state of the battery device 200 by using the degradation progress coefficient α determined by taking into account the depth of discharge (DOD), the determination accuracy of the degradation state can be improved as compared with the method of determining the degradation state of the battery device 200 by using the number of times of battery charging. According to the first exemplary embodiment, since it is possible to update the degradation state of the battery device 200 by using the degradation progress coefficient α determined by taking into account the depth of discharge (DOD), the determination accuracy of the degradation state can also be improved as compared with the method of determining the degradation state from the internal resistance of the battery cells. According to the first exemplary embodiment, since it is possible to update the degradation state of the battery device 200 without using a coulomb counter circuit or the like, the costs can be reduced and the power consumption can be decreased as compared with the method of determining the degradation state of the battery device by using the coulomb counter circuit or the like.

Second Exemplary Embodiment

Next, with reference to FIG. 1, FIG. 5, FIG. 6, and FIG. 7, the second exemplary embodiment will be described. The case has been described where the degradation coefficient β1 is not updated during the charging in the first degradation state determination process according to the first exemplary embodiment. In contrast to this, a case will be described where the degradation coefficient β1 is updated during the charging in a second degradation state determination process according to the second exemplary embodiment.

Figure 5:
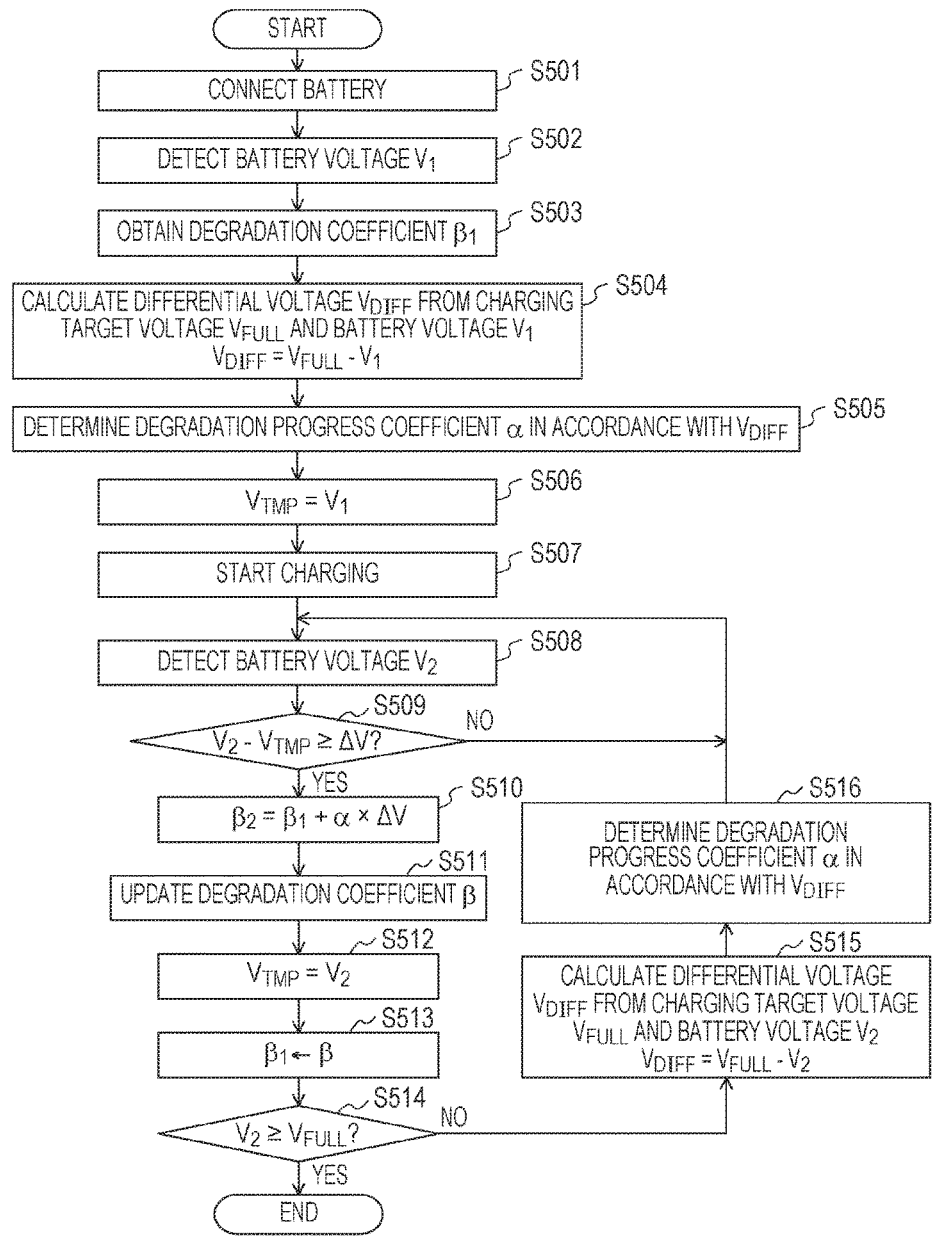
FIG. 5 is a flow chart for illustrating a second degradation state determination process.

FIG. 5 is a flow chart for illustrating the second degradation state determination process different from the first degradation state determination process. It should be noted that a program for controlling the execution of the second degradation state determination process is stored in the memory 105 such that the control unit 102 can execute the program.

In step S501, the control unit 102 detects that the battery device 200 is connected to the charging device 100.

In step S502, the voltage detection unit 104 detects the battery voltage V1 of the battery device 200 before the charging of the battery device 200 is started. The control unit 102 is notified of the battery voltage V1 detected by the voltage detection unit 104 from the voltage detection unit 104. The control unit 102 stores the battery voltage V1 notified from the voltage detection unit 104 in the memory M1 in the control unit 102.

In step S503, the control unit 102 transmits a signal for requesting the degradation coefficient β stored in the memory 203 to the control unit 205, and then receives the degradation coefficient β from the control unit 205. The control unit 102 stores the degradation coefficient β received from the control unit 205 in the memory M1 in the control unit 102 as the degradation coefficient β1 (first degradation information).

In step S504, the control unit 102 calculates a differential voltage VDIFF equivalent to a difference between the value of the charging target voltage VFULL and the value of the battery voltage V1 detected before the start of the charging. The control unit 102 stores the differential voltage VDIFF calculated in step S504 in the memory M1 in the control unit 102. It should be noted that information equivalent to the charging target voltage VFULL is stored in the memory 105 as the information that can be processed by the control unit 102.

In step S505, the control unit 102 determines the value of the degradation progress coefficient α (degradation progress information) in accordance with the differential voltage VDIFF calculated in step S504. The control unit 102 stores the value of the degradation progress coefficient α (degradation progress information) determined in step S505 in the memory M1 in the control unit 102.

Figure 6:
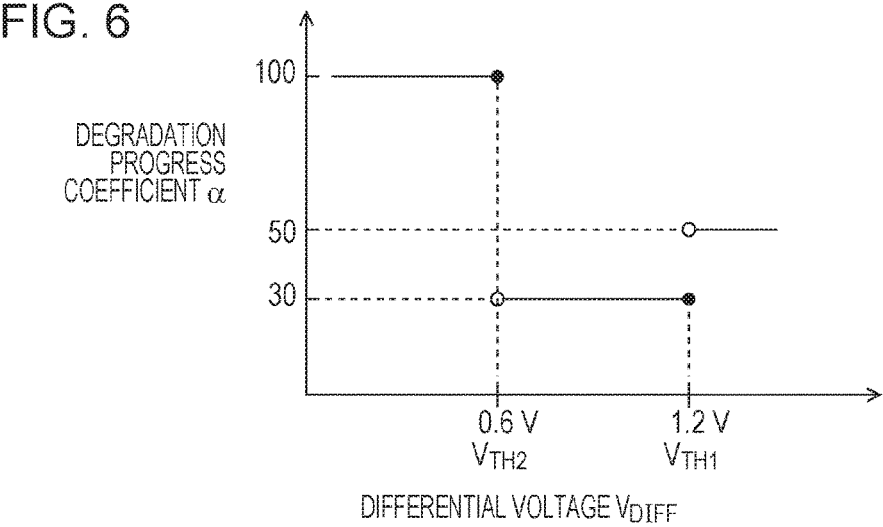
FIG. 6 is an explanatory diagram for illustrating another example relationship between a differential voltage and the degradation progress coefficient (degradation progress information).

FIG. 6 is an explanatory diagram for illustrating an example relationship between the differential voltage VDIFF that is calculated before the charging start or during the charging and the degradation progress coefficient α (degradation progress information). Information representing the relationship between the differential voltage VDIFF that is calculated before the charging start or during the charging and the degradation progress coefficient α (degradation progress information) is stored in the memory 105 as the information that can be processed by the control unit 102. In FIG. 6, the horizontal axis represents the differential voltage VDIFF equivalent to the difference between the charging target voltage VFULL and the battery voltage V1 or the battery voltage V2, and the vertical axis represents the degradation progress coefficient α (degradation progress information) determined by taking into account the depth of discharge (DOD). As illustrated in FIG. 6, according to the second exemplary embodiment, a segment of the differential voltage VDIFF is partitioned into a plurality of segments, and different values of the degradation progress coefficient α are allocated to the respective segments. For example, in FIG. 6, the segment of the differential voltage VDIFF is partitioned into three segments by the first threshold Vth1 and the second threshold Vth2. For example, the second threshold Vth2 is lower than the first threshold Vth1. According to the second exemplary embodiment, a case will be described where the first threshold Vth1 is approximately 1.2 V, and the second threshold Vth2 is approximately 0.6 V. In a case where the differential voltage VDIFF is lower than the second threshold Vth2 (approximately 0.6 V), the control unit 102 determines that the depth of discharge (DOD) is large, and 100 is also determined as the degradation progress coefficient α, for example. In a case where the differential voltage VDIFF is higher than or equal to the second threshold Vth2 (approximately 0.6 V) and lower than the first threshold Vth1 (approximately 1.2 V), the control unit 102 determines that the depth of discharge (DOD) is small, and 30 is also determined as the degradation progress coefficient α, for example. In a case where the differential voltage VDIFF is higher than or equal to the first threshold Vth1 (approximately 1.2 V), the control unit 102 determines that the depth of discharge (DOD) is relatively medium, and 50 is also determined as the degradation progress coefficient α, for example. It should be noted that information equivalent to the first threshold Vth1 and information equivalent to the second threshold Vth2 are stored in the memory 105 as the information that can be processed by the control unit 102.

In step S506, the control unit 102 sets the value of the battery voltage V1 detected before the start of the charging as the variable VTMP. The control unit 102 stores the variable VTMP where the value of the battery voltage V1 is set in the memory M1 in the control unit 102.

In step S507, the control unit 102 starts the charging of the battery device 200. The charging of the battery device 200 is performed while the control unit 102 controls the AC/DC conversion unit 101.

In step S508, the voltage detection unit 104 detects the battery voltage V2 of the battery device 200 during the charging of the battery device 200. The control unit 102 is notified of the battery voltage V2 detected by the voltage detection unit 104 from the voltage detection unit 104. The control unit 102 stores the battery voltage V2 notified from the voltage detection unit 104 in the memory M1 in the control unit 102.

In step S509, the control unit 102 calculates a difference between the value of the battery voltage V2 and the value of the variable VTMP and determines whether or not the difference (=V2−VTMP) is higher than or equal to the predetermined value ΔV. In a case where the difference between the value of the battery voltage V2 and the value of the variable VTMP is higher than or equal to the predetermined value ΔV, the control unit 102 shifts from step S509 to step S510 (S509: YES). In a case where the difference between the battery voltage V2 and the variable VTMP is lower than the predetermined value ΔV, the control unit 102 returns from step S509 to step S508 (S509: NO). It should be noted that the information equivalent to the predetermined value ΔV is stored in the memory 105 as the information that can be processed by the control unit 102.

In step S510, the control unit 102 calculates a new degradation coefficient β2 (second degradation information). The new degradation coefficient β2 (second degradation information) is calculated from the value of the degradation coefficient β1, the value of the degradation progress coefficient α determined on the basis of the battery voltage V1 or the battery voltage V2, and the predetermined value ΔV. For example, the control unit 102 calculates the new degradation coefficient β2 by using the following Expression (2). The control unit 102 stores the new degradation coefficient β2 calculated in step S510 in the memory M1 in the control unit 102.

$$\beta 2=\beta 1+\alpha \times \Delta V \qquad (2)$$

In step S511, to update the degradation coefficient β stored in the memory 203, the control unit 102 transmits the new degradation coefficient β2 to the control unit 205. In a case where the new degradation coefficient β2 is received from the control unit 102, the control unit 205 changes the degradation coefficient β stored in the memory 203 to the new degradation coefficient β2. For example, the control unit 205 overwrites the degradation coefficient β stored in the memory 203 with the new degradation coefficient β2. Accordingly, the degradation coefficient β stored in the memory 203 is updated to the degradation information indicating the latest degradation state of the battery device 200.

In step S512, the control unit 102 sets the value of the battery voltage V2 detected during the charging as the variable VTMP. The control unit 102 stores the variable VTMP where the value of the battery voltage V2 is set in the memory M1 in the control unit 102.

In step S513, the control unit 102 replaces the value of the degradation coefficient β1 obtained in step S503 with the new degradation coefficient β2 calculated in step S510. Accordingly, the control unit 102 can update the degradation coefficient β1 even during the charging.

In step S514, the control unit 102 determines whether or not the battery voltage V2 detected during the charging is higher than or equal to the charging target voltage VFULL. The charging target voltage VFULL is, for example, approximately 8.4 (V). It should be noted that information equivalent to the charging target voltage VFULL is stored in the memory 105 as the information that can be processed by the control unit 102. In a case where the battery voltage V2 detected during the charging is higher than or equal to the charging target voltage VFULL, the control unit 102 ends the charging of the battery device 200 (S514: YES). In a case where the battery voltage V2 detected during the charging is lower than the charging target voltage VFULL, the control unit 102 determines that the charging of the battery device 200 is not yet completed and shifts from step S514 to step S515 (S514: NO). The control unit 102 stores the degradation coefficient β1 changed in step S513 in the memory Nun the control unit 102.

In step S515, the control unit 102 calculates the differential voltage VDIFF equivalent to the difference between the value of the charging target voltage VFULL and the value of the battery voltage V2 detected during the charging. The control unit 102 stores the differential voltage VDIFF calculated in step S515 in the memory M1 in the control unit 102.

In step S516, the control unit 102 determines the value of the degradation progress coefficient α (degradation progress information) again in accordance with the differential voltage VDIFF calculated in step S515. Accordingly, the value of the degradation progress coefficient α (degradation progress information) corresponds to a value obtained by taking into account the degradation degree of the battery device 200 that has progressed during the charging. The control unit 102 replaces the value of the degradation progress coefficient α determined in step S505 with the value of the degradation progress coefficient α determined in step S516 and stores the value of the degradation progress coefficient α determined in step S516 in the memory M1 in the control unit 102.

Figure 7:
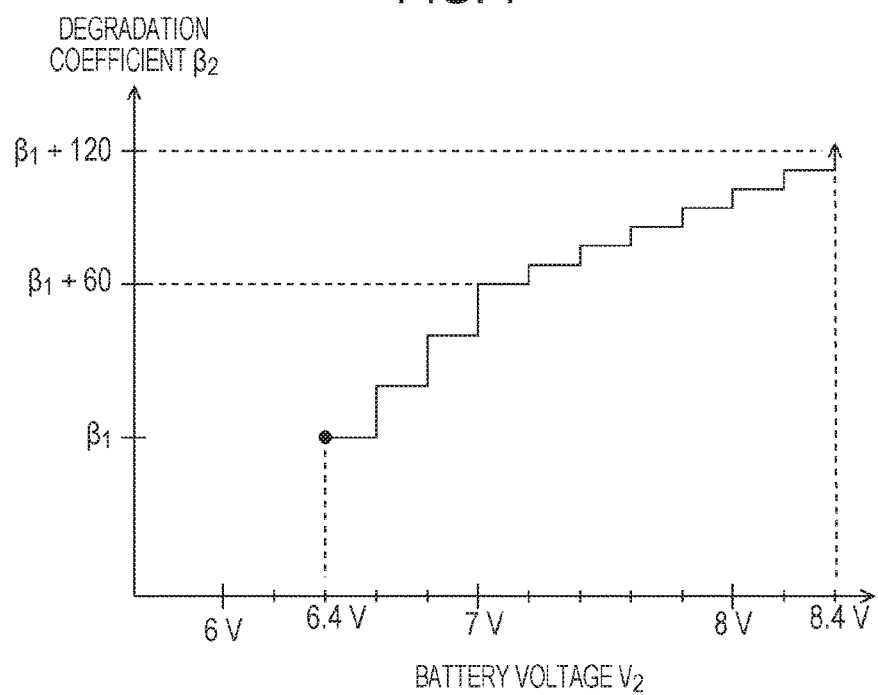
FIG. 7 is an explanatory diagram for illustrating another example relationship between the battery voltage and the new degradation coefficient (second degradation information).

FIG. 7 is an explanatory diagram for illustrating an example relationship between the battery voltage V2 and the new degradation coefficient β2 (second degradation information). Information representing the relationship between the battery voltage V2 and the new degradation coefficient β2 (second degradation information) is stored in the memory 105 as the information that can be processed by the control unit 102. In FIG. 7, the horizontal axis represents the battery voltage V2, and the vertical axis represents the degradation coefficient β2 (second degradation information). The example illustrated in FIG. 7 indicates a change example in a case where the battery device 200 is charged such that the battery voltage V2 reaches 8.4 V from 6.4 V. According to the second exemplary embodiment, each time the charging by the amount equivalent to the predetermined value ΔV is performed, the value of the degradation progress coefficient α indicating the degradation progress degree of the battery device 200 is determined again, so that the change in the degradation coefficient β2 is not constant. Thus, according to the second exemplary embodiment, it is possible to determine the latest degradation state of the battery device 200 by taking into account the degradation degree that has progressed during the charging.

As described above, according to the second exemplary embodiment, the value of the degradation progress coefficient α (degradation progress information) indicating the degradation progress degree of the battery device 200 can be determined in accordance with the battery voltage V1 detected before the start of the charging. Furthermore, according to the second exemplary embodiment, each time the charging by the amount equivalent to the predetermined value ΔV is performed, the latest degradation state of the battery device 200 can be determined from the degradation progress coefficient α (degradation progress information) and the degradation coefficient β1. Thus, according to the second exemplary embodiment, the degradation state of the battery device 200 can be determined by a method different from the method in the related art. Furthermore, according to the second exemplary embodiment, since the degradation coefficient β1 is updated during the charging, it is possible to take into account the degradation degree of the battery device 200 which has progressed during the charging. As a result, the latest degradation state of the battery device 200 determined according to the second exemplary embodiment is the state in which the degradation that has progressed during the charging is taken into account.

According to the second exemplary embodiment, each time the charging by the amount equivalent to the predetermined value ΔV is performed, the degradation coefficient β stored in the memory 203 can be updated to the degradation coefficient β2 indicating the latest degradation state of the battery device 200. With the above-described configuration, while the charging device 100 obtains the degradation coefficient β from the memory 203, the latest degradation state of the battery device 200 can be found out. While the electronic device (such as the image pickup apparatus) to which the battery device 200 is connected also obtains the degradation coefficient β from the memory 203, the latest degradation state of the battery device 200 can be found out. In addition, with the above-described configuration, according to the second exemplary embodiment, even when the battery device 200 is cut off from the charging device 100 during the charging, the degradation coefficient β stored in the memory 203 corresponds to the information indicating the latest degradation state of the battery device 200.

According to the second exemplary embodiment, since it is possible to update the degradation state of the battery device 200 by using the degradation progress coefficient α determined by taking into account the depth of discharge (DOD), the determination accuracy of the degradation state can be improved as compared with the method of determining the degradation state of the battery device 200 by using the number of times of battery charging. According to the second exemplary embodiment, since it is possible to update the degradation state of the battery device 200 by using the degradation progress coefficient α determined by taking into account the depth of discharge (DOD), the determination accuracy of the degradation state can also be improved as compared with the method of determining the degradation state from the internal resistance of the battery cells. According to the second exemplary embodiment, since it is possible to update the degradation state of the battery device 200 without using the coulomb counter circuit or the like, the costs can be reduced and the power consumption can be decreased as compared with the method of determining the degradation state of the battery device by using the coulomb counter circuit or the like.

Third Exemplary Embodiment

Next, with reference to FIG. 1 and FIG. 8, the third exemplary embodiment will be described. According to the third exemplary embodiment, a modified example of the second exemplary embodiment will be described. According to the third exemplary embodiment, a configuration will be described in which the detection of the battery voltage V1 of the battery device 200 and the change in the degradation coefficient β stored in the memory 203 are executed at every determined time by using the timer function of the control unit 102.

FIG. 8 is a flow chart for illustrating a third degradation state determination process different from the second degradation state determination process. It should be noted that a program for controlling the execution of the third degradation state determination process is stored in the memory 105 such that the control unit 102 can execute the program.

Since the processes performed in steps S501 to S507 illustrated in FIG. 8 are similar to those performed in steps S501 to S507 illustrated in FIG. 5, according to the third exemplary embodiment, the descriptions of the processes performed in steps S501 to S507 will be omitted. After the charging of the battery device 200 is started in step S507, the control unit 102 shifts from step S507 to step S801.

In step S801, the control unit 102 initializes the timer function of the control unit 102 to start a timer for a predetermined time T1.

In step S802, the control unit 102 determines whether or not the predetermined time T1 has elapsed. When it is determined that the predetermined time 11 has elapsed, the control unit 102 shifts from step S802 to step S803 (S802: YES). When it is determined that the predetermined time T1 has not elapsed, the control unit 102 repeats step S802 (S802: NO).

In step S803, the voltage detection unit 104 detects the battery voltage V2 of the battery device 200 during the charging of the battery device 200. The control unit 102 is notified of the battery voltage V2 detected by the voltage detection unit 104 from the voltage detection unit 104. The control unit 102 stores the battery voltage V2 notified from the voltage detection unit 104 in the memory M1 in the control unit 102.

In step S804, the control unit 102 calculates a differential value ΔV (=V2−VTMP) from the value of the battery voltage V2 and the value of the variable VTMP. It should be noted that information equivalent to the differential value ΔV is stored in the memory 105 as the information that can be processed by the control unit 102.

In step S805, the control unit 102 initializes the timer function of the control unit 102 again to start the timer for the predetermined time T1.

In step S806, the control unit 102 calculates a new degradation coefficient β2 (second degradation information). The new degradation coefficient β2 (second degradation information) is calculated from the value of the degradation coefficient β1, the degradation progress coefficient α determined on the basis of the battery voltage V1 or the battery voltage V2, and the differential value ΔV. For example, the control unit 102 calculates the new degradation coefficient β2 by using the following Expression (3). The control unit 102 stores the new degradation coefficient β2 calculated in step S806 in the memory M1 in the control unit 102. After the new degradation coefficient 132 calculated in step S806 is stored in the memory M1, the control unit 102 shifts from step S806 to step S511.

$$\beta 2 = \beta 1 + \alpha \times \Delta v \qquad (3)$$

Since the processes performed in steps S511 to S516 illustrated in FIG. 8 are similar to those in steps S511 to S516 illustrated in FIG. 5, according to the third exemplary embodiment, descriptions of the processes performed in steps S511 to S516 are omitted. After the degradation progress coefficient α (degradation progress information) is determined again in step S516, the control unit 102 shifts from step S516 to step S802.

As described above, according to the third exemplary embodiment, the value of the degradation progress coefficient α (degradation progress information) indicating the degradation progress degree of the battery device 200 can be determined in accordance with the battery voltage V1 detected before the start of the charging. Furthermore, according to the third exemplary embodiment, each time the charging by the amount equivalent to the predetermined value ΔV is performed, the latest degradation state of the battery device 200 can be determined from the degradation progress coefficient α (degradation progress information) and the degradation coefficient β1. Thus, according to the third exemplary embodiment, the degradation state of the battery device 200 can be determined by a method different from the method in the related art. Furthermore, according to the third exemplary embodiment, since the degradation coefficient β1 is updated during the charging, it is possible to take into account the degradation degree of the battery device 200 which has progressed during the charging. As a result, the latest degradation state of the battery device 200 determined according to the third exemplary embodiment is the state in which the degradation that has progressed during the charging is taken into account.

In addition, according to the third exemplary embodiment, each time the charging by the amount equivalent to the predetermined value ΔV is performed, the degradation coefficient β stored in the memory 203 can be updated to the degradation coefficient β2 indicating the latest degradation state of the battery device 200. With the above-described configuration, while the charging device 100 obtains the degradation coefficient β from the memory 203, the latest degradation state of the battery device 200 can be found out. While the electronic device (such as the image pickup apparatus) to which the battery device 200 is connected also obtains the degradation coefficient β from the memory 203, the latest degradation state of the battery device 200 can be found out. In addition, with the above-described configuration, according to the third exemplary embodiment, even when the battery device 200 is cut off from the charging device 100 during the charging, the degradation coefficient β stored in the memory 203 corresponds to the information indicating the latest degradation state of the battery device 200.

According to the third exemplary embodiment, since it is possible to update the degradation state of the battery device 200 by using the degradation progress coefficient α determined by taking into account the depth of discharge (DOD), the determination accuracy of the degradation state can be improved as compared with the method of determining the degradation state of the battery device 200 by using the number of times of battery charging. According to the third exemplary embodiment, since it is possible to update the degradation state of the battery device 200 by using the degradation progress coefficient α determined by taking into account the depth of discharge (DOD), the determination accuracy of the degradation state can also be improved as compared with the method of determining the degradation state from the internal resistance of the battery cells. According to the third exemplary embodiment, since it is possible to update the degradation state of the battery device 200 without using the coulomb counter circuit or the like, the costs can be reduced and the power consumption can be decreased as compared with the method of determining the degradation state of the battery device by using the coulomb counter circuit or the like.

It should be noted that, according to the continuation of the second and third exemplary embodiments, the value of the degradation progress coefficient α (degradation progress information) is determined in accordance with the differential voltage VDIFF, but a configuration may be adopted in which the value of the degradation progress coefficient α (degradation progress information) is determined in accordance with a numeric expression corresponding co characteristics of the battery device 200.

Fourth Exemplary Embodiment

The various functions, processes, and methods described in the first to third exemplary embodiments can also be realized while a personal computer, a microcomputer, a central processing unit (CPU), or the like uses the program. Hereinafter, according to the fourth exemplary embodiment, the personal computer, the microcomputer, the CPU, or the like will be referred to as a "computer X". Furthermore, according to fourth exemplary embodiment, a program for controlling the computer X and realizing the various functions, processes, and methods described according to the first third exemplary embodiments is referred to as a "program Y".

The various functions, processes, and methods described according to the first third exemplary embodiments are realized while the computer X executes the program Y. In this case, the program. Y is supplied to the computer X via a computer readable storage medium. The computer readable storage medium according to the fourth exemplary embodiment includes at least one of a hard disc drive, a magnetic storage apparatus, an optical storage apparatus, an opto-magnetic storage apparatus, a memory card, a volatile memory, a nonvolatile memory, and the like. The computer readable storage medium according to the fourth exemplary embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims priority from Japanese Patent Application No. 2015-019609, filed Feb. 3, 2015, which is hereby incorporated by reference herein in its entirety.

What is claimed is:

1. A charging device comprising:
a charging unit configured to charge a battery device, wherein the battery device includes a memory configured to store first degradation information indicating a degradation state of the battery device;
a voltage detection unit configured to detect a first voltage of the battery device before the charging unit starts charging the battery device and to detect a second voltage of the battery device when the charging unit is charging the battery device; and
a control unit configured to perform control including:
(a) receiving the first degradation information from the battery device before the charging unit starts charging the battery device,
(b) determining, before the charging unit starts charging the battery device and by using the first voltage detected by the voltage detection unit, degradation progress information indicating a progress degree of the degradation state of the battery device,
(c) calculating a differential voltage between the first voltage detected by the voltage detection unit and the second voltage detected by the voltage detection unit when the charging unit is charging the battery device,
(d) generating, when the differential voltage is higher than or equal to a predetermined value and by using (i) the differential voltage, (ii) the degradation progress information, and (iii) the first degradation information, second degradation information indicating a degradation state of the battery device, and
(e) transmitting the generated second degradation information to the battery device to cause the battery device to change the first degradation information stored in the memory to the second degradation information.

2. The charging device according to claim 1, wherein determining includes determining the degradation progress information from a value corresponding to the first voltage detected by the voltage detection unit.

3. The charging device according to claim 1, wherein determining includes determining the degradation progress information from a value corresponding to a differential voltage between the first voltage detected by the voltage detection unit and a charging target voltage.

4. A battery device comprising:
a memory configured to store first degradation information indicating a degradation state of the battery device; and
a battery device control unit configured to perform control including:
(a) transmitting the first degradation information to a charging device before a charging unit included in the charging device starts charging the battery device, (b) receiving, from the charging device, second degradation information indicating a degradation state of the battery device, and (c) changing the first degradation information stored in the memory to the second degradation information after the second degradation information is received from the charging device, wherein the charging device includes:

the charging unit configured to charge the battery device, a voltage detection unit configured to detect a first voltage of the battery device before the charging unit starts charging the battery device and to detect a second voltage of the battery device when the charging unit is charging the battery device, and a charging device control unit configured to perform control including:

(a) receiving the first degradation information from the battery device before the charging unit starts charging the battery device, (b) determining, before the charging unit starts charging the battery device and by using the first voltage detected by the voltage detection unit, degradation progress information indicating a progress degree of the degradation state of the battery device, (c) calculating a differential voltage between the first voltage detected by the voltage detection unit and the second voltage detected by the voltage detection unit when the charging unit is charging the battery device, (d) generating, when the differential voltage is higher than or equal to a predetermined value and by using (i) the differential voltage, (ii) the degradation progress information, and (iii) the first degradation information, second degradation information indicating a degradation state of the battery device, and (e) transmitting the generated second degradation information to the battery device to cause the battery device to change the first degradation information stored in the memory.

5. The battery device according to claim 4, wherein determining includes determining the degradation progress information from a value corresponding to the first voltage detected by the voltage detection unit.

6. The battery device according to claim 4, wherein determining includes determining the degradation progress information from a value corresponding to a differential voltage between the first voltage detected by the voltage detection unit and a charging target voltage.

7. A method for a charging device having a charging unit to charge a battery device, wherein the battery device includes a memory configured to store first degradation information indicating a degradation state of the battery device, a voltage detection unit, and a control unit, the method comprising:

causing the voltage detection unit to detect a first voltage of the battery device before the charging unit starts charging the battery device;

receiving the first degradation information from the battery device before the charging unit starts charging the battery device;

determining, before the charging unit starts charging the battery device and by using the first voltage detected by the voltage detection unit, degradation progress information indicating a progress degree of the degradation state of the battery device;

causing the charging unit to charge the battery device;

causing the voltage detection unit to detect a second voltage of the battery device when the charging unit is charging the battery device;

calculating a differential voltage between the first voltage detected by the voltage detection unit and the second voltage detected by the voltage detection unit when the charging unit is charging the battery device;

generating, when the differential voltage is higher than or equal to a predetermined value and by using (i) the differential voltage, (ii) the degradation progress information, and (iii) the first degradation information, second degradation information indicating a degradation state of the battery device; and transmitting the generated second degradation information to the battery device to cause the battery device to change the first degradation information stored in the memory to the second degradation information.

8. The method according to claim 7, wherein determining includes determining the degradation progress information from a value corresponding to the first voltage detected by the voltage detection unit.

9. The method according to claim 7, wherein determining includes determining the degradation progress information from a value corresponding to a differential voltage between the first voltage detected by the voltage detection unit and a charging target voltage.

10. A method for a battery device having a battery device control unit and a memory configured to store first degradation information indicating a degradation state of the battery device, the method comprising:

transmitting the first degradation information to a charging device before a charging unit included in the charging device starts charging the battery device;

receiving, from the charging device, second degradation information indicating a degradation state of the battery device; and changing the first degradation information stored in the memory to the second degradation information after the second degradation information is received from the charging device, wherein the charging device includes:

the charging unit configured to charge the battery device, a voltage detection unit configured to detect a first voltage of the battery device before the charging unit starts charging the battery device and to detect second voltage of the battery device when the charging unit is charging the battery device, and a charging device control unit configured to perform control including:

(a) receiving the first degradation information from the battery device before the charging unit starts charging the battery device, (b) determining, before the charging unit starts charging the battery device and by using the first voltage detected by the voltage detection unit, degradation progress information indicating a progress degree of the degradation state of the battery device, (c) calculating a differential voltage between the first voltage detected by the voltage detection unit and the second voltage detected by the voltage detection unit when the charging unit is charging the battery device, (d) generating, when the differential voltage is higher than or equal to a predetermined value and by using (i) differential voltage, (ii) the degradation progress information, and (iii) the first degradation information, second degradation information indicating a degradation state of the battery device, and (e) transmitting the generated second degradation information to the battery device to cause the battery device to change the first degradation information stored in the memory to the second degradation information.

11. The method according to claim 10, wherein determining includes determining the degradation progress information from a value corresponding to the first voltage detected by the voltage detection unit.

12. The method according to claim 10, wherein determining includes determining the degradation progress information from a value corresponding to a differential voltage between the first voltage detected by the voltage detection unit and a charging target voltage.

13. A non-transitory storage medium storing a program to cause a computer to perform a method for a charging device having a charging unit to charge a battery device, wherein the battery device includes a memory configured to store first degradation information indicating a degradation state of the battery device, a voltage detection unit, and a control unit, the method comprising:
- causing the voltage detection unit to detect a first voltage of the battery device before the charging unit starts charging the battery device;
- receiving the first degradation information from the battery device before the charging unit starts charging the battery device;
- determining, before the charging unit starts charging the battery device and by using the first voltage detected by the voltage detection unit, degradation progress information indicating a progress degree of the degradation state of the battery device;
- causing the charging unit to charge the battery device;
- causing the voltage detection unit to detect a second voltage of the battery device when the charging unit is charging the battery device;
- calculating a differential voltage between the first voltage detected by the voltage detection unit and the second voltage detected by the voltage detection unit when the charging unit is charging the battery device;
- generating, when the differential voltage is higher than or equal to a predetermined value and by using (i) the differential voltage, (ii) the degradation progress information, and (iii) the first degradation information, second degradation information indicating a degradation state of the battery device; and
- transmitting the generated second degradation information to the battery device to cause the battery device to change the first degradation information stored in the memory to the second degradation information.

14. A non-transitory storage medium storing a program to cause a computer to perform a method for a battery device having a battery device control unit and a memory configured to store first degradation information indicating a degradation state of the battery device, the method comprising:
- transmitting the first degradation information to a charging device before a charging unit included in the charging device starts charging the battery device;
- receiving, from the charging device, second degradation information indicating a degradation state of the battery device; and
- changing the first degradation information stored in the memory to the second degradation information after the second degradation information is received from the charging device,
- wherein the charging device includes:
- the charging unit configured to charge the battery device,
- a voltage detection unit configured to detect a first voltage of the battery device before the charging unit starts charging the battery device and to detect a second voltage of the battery device when the charging unit is charging the battery device, and
- a charging device control unit configured to perform control including:
- (a) receiving the first degradation information from the battery device before the charging unit starts charging the battery device,
- (b) determining, before the charging unit starts charging the battery device and by using the first voltage detected by the voltage detection unit, degradation progress information indicating a progress degree of the degradation state of the battery device,
- (c) calculating a differential voltage between the first voltage detected by the voltage detection unit and the second voltage detected by the voltage detection unit when the charging unit is charging the battery device,
- (d) generating, when the differential voltage is higher than or equal to a predetermined value and by using (i) the differential voltage, (ii) the degradation progress information, and (iii) the first degradation information, second degradation information indicating a degradation state of the battery device, and
- (e) transmitting the generated second degradation information to the battery device to cause the battery device to change the first degradation information stored in the memory to the second degradation information.

* * * * *